Patented May 26, 1953

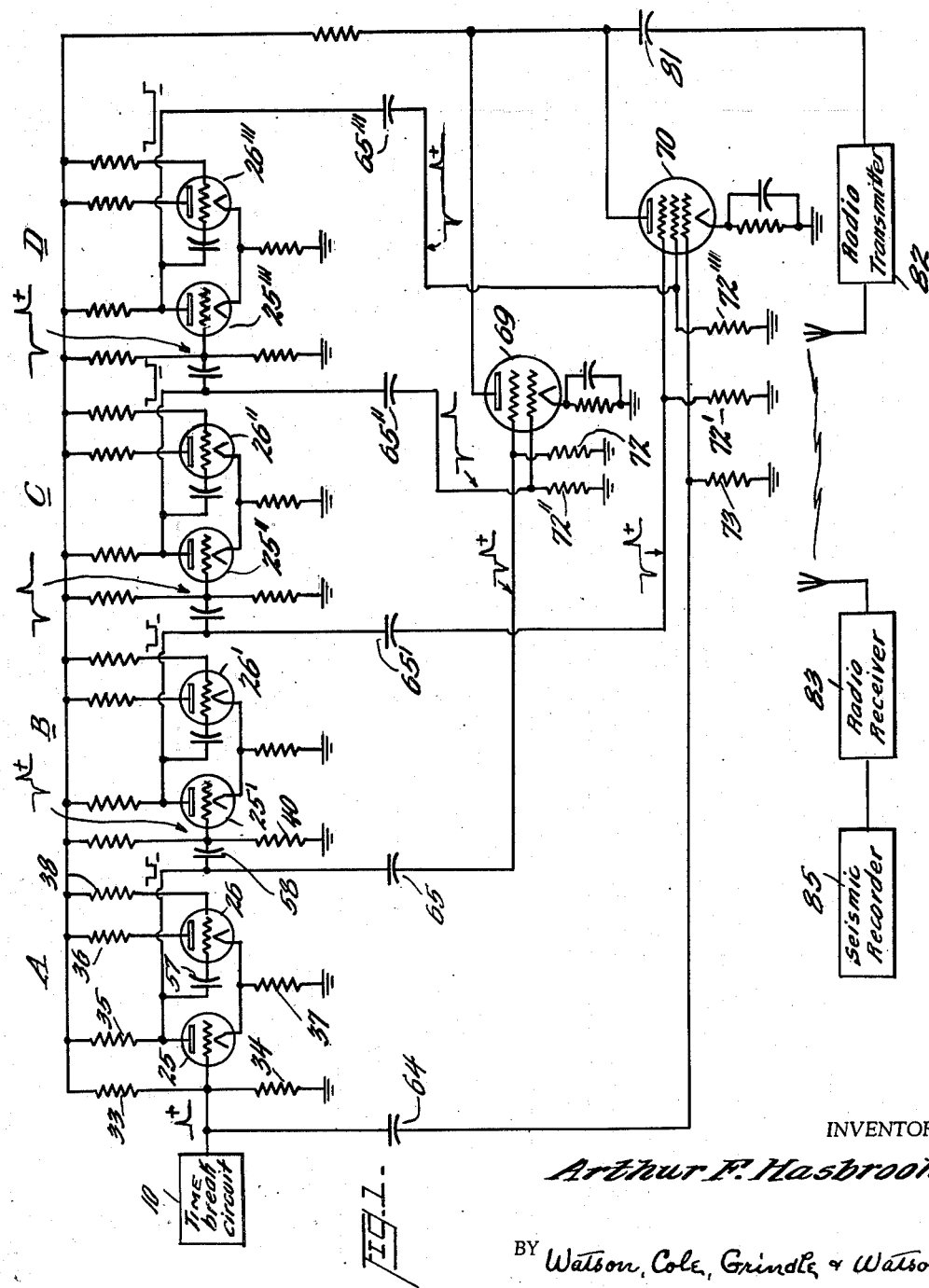

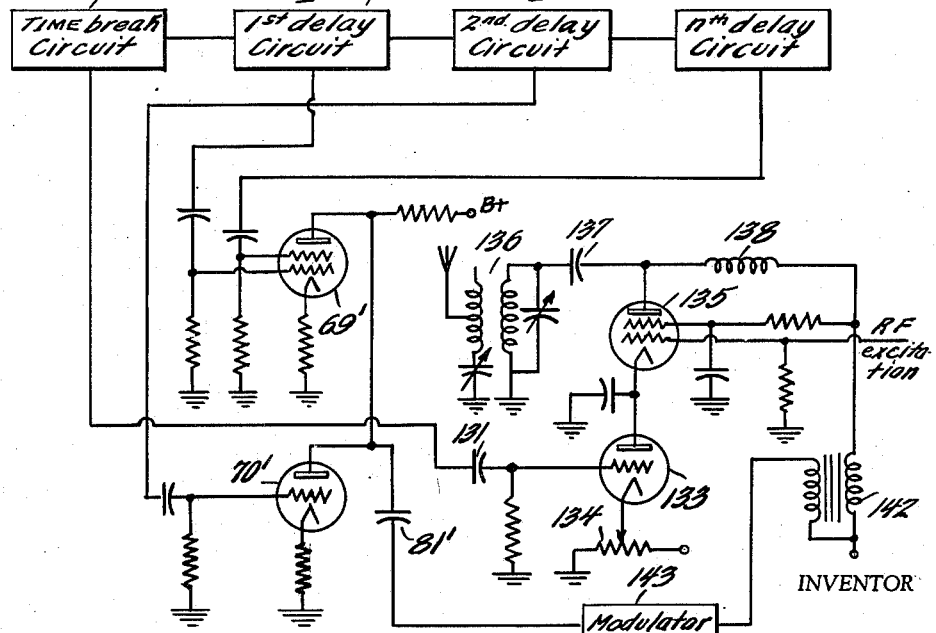

2,640,187

UNITED STATES PATENT OFFICE 2,640,187

SEISMIC SURVEYING

Arthur F. Hasbrook, San Antonio, Tex., assignor to Olive S. Petty, San Antonio, Tex.

Application June 13, 1949, Serial No. 98,784

6 Claims. (Cl. 340—16)

This invention relates to methods and apparatus for use in seismic surveying, and more especially to improvements in the practice of recording time-break signals, by means of which the instant of detonation of the explosive charge may be recorded and invariably determined with accuracy at a station remote from the blast.

In the field of seismic surveying, it is the customary practice to generate seismic waves in the earth by firing a charge of high explosive, such as dynamite or blasting gelatin, either adjacent to or beneath the surface. The seismic waves so created are reflected upwardly from various discontinuities beneath the surface and are received at a plurality of stations some distance from the source of the shock. At each receiving point, the seismic waves are received by an instrument, sometimes called a seismometer, and converted into electrical waveform energy, which is amplified and recorded; a plurality of traces, each representing the seismic energy received at one of the several seismometers, is commonly recorded on a single chart or seismogram. In order to interpret these traces, and especially to determine the various depths from which the seismic energy has been reflected, it is essential that the exact time of firing the explosive charge be noted on the same seismogram.

In the practice most commonly followed, the instant of firing the charge, or the time-break, is represented by a single pulse on the record, often transmitted from the shotpoint to the recording station by radio, and is occasionally obscured by interfering signals or stray energy. When this occurs, the seismic record is difficult to interpret and may even be rendered worthless. The obscuring of the time break is, of course, especially common and costly in exploration of the long distance refraction type, in which radio transmission is essential. Various attempts, partly successful, have been made in the past to obviate these difficulties and to insure identification and exact location of the time-break signal, these including the use of mechanical switching units designed to give a succession of signals, whereby the instant of firing may be computed when the original time-break pulse is obscured. One of the difficulties encountered in the use of such devices is the inevitable lack of timing accuracy in the generation of a series of signals by mechanical means.

It is, therefore, an object of the invention to overcome these and other defects in the practice of recording time-break signals by generating in electronic circuits a series of accurately spaced pulses, each bearing a definite relation in time to the original time-break pulse, the original pulse and the separately generated series of pulses being combined, preferably in opposite polarity to avoid confusion, and suitably transmitted and recorded.

In my copending application, S. N. 98,783, filed concurrently herewith, this broader aspect of the invention is disclosed and claimed in connection with apparatus comprising a damped wave generator, the generator being energized from the firing circuit to produce a series of waves of decaying amplitude and constant repetition rate determined by the characteristics of the circuit components, these waves being subsequently formed into pulses which may be combined with the original pulse so as to be readily distinguishable therefrom. The instant invention is concerned with an embodiment employing a plurality of time-delay circuits, whereby a series of delayed pulses are derived from the original time-break pulse and combined with the original pulse for transmission and recording. It will be appreciated that with such an arrangement the constants of the several time-delay circuits may be so chosen that the series of succeeding pulses are produced at varying intervals of time, whereby identification of any given pulse on the record is facilitated.

As a further feature of the invention, transmission to the recording station of the time-break signals so produced may be effected by applying the series of pulses to a carrier wave, radiation of the carrier being initiated by the original time-break pulse, while the following series of pulses is applied as modulation on the carrier. Thus the instant of arrival of the carrier wave at the remote recording station denotes the true time break, whereas the succeeding series of pulses affords an accurate record from which the correct position of the time break may be computed in the event the instant of arrival of the carrier is obscured.

Further objects and features of the invention will be apparent from the following description taken in connection with the accompanying drawings, in which:

Figure 1 represents diagrammatically a seismic system suitable for the practice of the invention, illustrating a preferred form of pulse delaying circuit;

Figure 2 is a series of graphs showing the pulsed signals appearing at different points in the circuit of Figure 1;

Figure 3 is a wiring diagram of a preferred form of transmitting circuit for use in the practice of the invention, and Figure 4 represents part of a seismogram on which appears a time-break trace such as may be produced by the use of the apparatus represented in Figure 3.

In order to promote an understanding of the invention, reference is made to the specific embodiment thereof illustrated in the accompanying drawings and the same is described in detail hereinafter. It will nevertheless be understood that such modifications and alterations of the invention are contemplated as would normally occur to those skilled in the art to which the invention relates.

In Figure 1 is represented diagrammatically a system for the generation, transmission, and recording of time-break signals, components of the system which may be conventional being shown as in a block diagram and bearing appropriate legends. Thus the source of the usual time-break pulse is represented at 10. This pulse is applied to a series of time-delay circuits illustrated in detail, the first of such circuits being energized by the time-break pulse and the succeeding circuits being each energized from the output of a preceding circuit.

Thus the initial time-break pulse from source 10, which may be derived from the firing circuit as shown in the patents to Parr, Jr., 2,331,623, Petty 2,331,627, or in any other appropriate manner, is applied to a multivibrator circuit A constituting the first of a series of time-delay circuits, the remaining circuits of the series, represented at B, C, and D, being essentially similar to the first except for the characteristics of the components thereof, which are preferably chosen so as to produce the unequal spacing between pulses hereinbefore mentioned. For convenience, only the first of these circuits and the coupling between the first and second circuits will be specifically described, the function of the remaining circuits being obvious.

Thus circuit A employs electron tubes 25 and 26, anode load resistors 35 and 36, grid resistors 34 and 38, divider resistor 33, cathode resistor 37 and coupling capacitor 57. It will be recognized by those skilled in the art that a circuit of this character, commonly known as a cathode coupled multivibrator, functions essentially as follows.

Tube 26 is normally rendered conducting by the positive bias impressed on its grid through resistor 38; current flows through resistor 37 to produce a positive voltage on the cathodes of both tubes 25 and 26. The grid of tube 25 is supplied with a positive bias through divider resistors 33 and 34, which overcomes much of the positive voltage thus applied to the cathode. However, in the absence of signals, tube 25 is normally nonconducting.

When the positive pulse from source 10 is applied to the grid of tube 25, the tube becomes conducting and a large negative pulse appears at the anode, and is impressed through condenser 57 on the grid of tube 26, so as to render the latter nonconducting. Condenser 57 and resistor 38 form a differentiating network which produces an exponential timing waveform at the grid of tube 26. As this waveform rises from the initial negative maximum toward zero, a point is reached at which tube 26 becomes conducting, and the pulse is promptly terminated. Thus the output of multivibrator A, appearing at the anode of tube 25, is a negative pulse having a duration which is determined principally by the values of condenser 57 and resistor 38. This negative pulse is differentiated by condenser 58 and resistor 40 to form a negative pulse and a following positive pulse, these pulses corresponding to the leading and trailing edges respectively of the pulse from which they are derived. The spaced negative and positive pulses so produced are applied to the succeeding multivibrator circuit B comprising tubes $25^1$ and $26^1$ and a network essentially similar to that described with reference to circuit A. Since tube $25^1$ is normally nonconducting, the initial negative pulse does not trigger the circuit, but the delayed positive pulse initiates operation of circuit B. The output from circuit B is similarly differentiated and employed to trigger circuit C, and so on. The delayed pulse signals produced by circuits B, C, and D, and the initial time-break pulse, are then applied, as shown in Figure 1, to the grids of multigrid tubes 69 and 70, wherein they are combined in a common anode circuit.

The time-break pulse is a single positive pulse, whereas the pulse appearing in the output of each of the circuits A, B, C and D is a negative pulse having a duration determined by the circuit constants. These negative pulses are differentiated and the resulting signal, comprising in each instance a negative pulse and a following positive pulse are applied to respective grids of tubes 69 and 70. Thus the differentiating elements for the output of circuit A comprise condenser 65 and resistor 72, for the output of circuit B, condenser $65^1$ and resistor $72^1$, and son on. The time-break pulse is applied to a grid of tube 70 through condenser 64 and resistor 73 which effect differentiation to sharpen the pulse. Since the negative pulse of the signal from one delay circuit occurs almost simultaneously with the positive pulse of the signal from the preceding circuit, the outputs of alternate delay circuits are combined in different tubes to prevent cancellation. Thus the original time-break pulse and the differentiated signal output of delay circuits B and D are combined in tube 70 by application to the respective grids thereof, whereas the signals from delay circuits A and C are combined similarly in tube 69.

Tubes 69 and 70 are preferably operated at or near cut-off so that only positive signals are effective to cause plate current flow. It will be appreciated, therefore, that a series of negative pulses corresponding to the initial time-break pulse and to the positive pulses derived from each of the delay circuits A, B, C, and D will appear in the common output circuit of tubes 69 and 70. The entire series of pulses may then be applied through condenser 81 to transmitter 82, wherein the pulses are applied as modulation of a radiated carrier wave. The signal may be received at the remote recording point by receiver 83, demodulated, and supplied to recorder 85 for concurrent recording with the seismic signals produced by the blast in the conventional manner.

By appropriate selection of constants in the several time-delay circuits, and especially the values of condenser 57 and resistor 38, irregular spacing of the recorded pulses may be effected as hereinbefore mentioned. In one arrangement found quite satisfactory, the period between pulses is progressively increased, the time interval between the time-break pulse and the first delay signal being .05 second, between the first and the second delayed signals .1 second, between the second and the third delayed signals .15 second, and so on. Thus the time intervals may be so arranged that if any two pulses of the series are recorded, the position of the time-break pulse, even though entirely obscured on the record, may be readily determined.

In the embodiment of the invention selected for the purpose of illustration, each of the several time-delay circuits is energized by a pulsed signal from a preceding circuit. This is, of course, not essential, energization of any or all of the time-delay circuits directly by the initial time-break pulse being entirely satisfactory provided correct constants are selected. It will also be appreciated that the time-delay circuits need not be constructed as illustrated and described herein, other conventional delay circuits such as blocking oscillators, gas tube relaxation oscillators or even lumped transmission lines employing no tubes, may be used for the purpose.

In Figure 2 are illustrated graphically the signal pulses produced at various points in the circuits shown in Figure 1, as indicated by the legends, which are self explanatory. It will be appreciated that a signal in which the pulses occur at irregular time intervals, as in the last curve of Figure 2, is in some respects superior to one in which the succeeding pulses are equally spaced but differ in amplitude, as in my copending application hereinbefore mentioned, for the purpose of locating with exactness the correct position of the initial time-break pulse.

In Figure 3 is illustrated a system for the radiation of signal energy, generated as hereinbefore described, for recording at a remote point, wherein the transmitter is energized by the original time-break pulse to transmit a carrier wave which is modulated by the several delayed pulses. Thus the delayed negative pulses in the output of the several delay circuits A, B, . . . D are applied to the grids of tubes 69¹ and 70¹ in the manner illustrated and described with reference to Figure 1 of the drawing in such manner as to derive from the differentiated outputs a series of negative pulses of irregular spacing. These pulses are fed through condenser 81¹ to a modulator 143 and thence through transformer 142 and choke 138 to the output of tube 135 of a conventional modulated R. F. amplifier stage, whereby the pulsed signal is applied to modulate the carrier wave generated thereby. The modulated signal is then fed through condenser 137 and transformer 136 to the antenna for radiation to the remote recording station.

Instead of combining the initial time-break pulse with the delayed pulses, as in the embodiment illustrated in Figure 1, the time-break pulse is supplied through condenser 131 to the grid of thyratron tube 133, which is normally biased off by a positive voltage applied to the cathode by potentiometer 134. Thyratron tube 133 is connected in series with tube 135, the arrangement being such that plate current flow in tube 135 is initiated when the thyratron is fired. Thus on the instant of arrival at tube 133 of the initial positive time-break pulse, the thyratron is fired to energize tube 135 and initiate radiation of the carrier wave, which is then modulated as hereinbefore described by the delayed pulses.

Figure 4 represents a portion of a seismogram, showing a timing trace such as may be obtained when the circuit of Figure 3 is employed. The first pulse of the trace results from the turning on of the carrier at the transmitter in response to the initial time-break pulse, whereas the succession of trailing pulses of opposite polarity correspond to the delayed negative pulses with which the carrier wave is modulated. Identification of the several pulses is furthered by the difference in polarity between the initial and the delayed pulses inherent in this method of transmission, since if only the initial time-break pulse be recorded and the remaining pulses be all obscured, the initial pulse is readily identified as such. As in the previously described embodiment of the invention, recording of any two pulses of the series is sufficient to determine exactly the position of the initial time-break pulse.

Having thus described the invention, what is claimed as new and desired to be secured by Letters Patent is:

1. Apparatus for use in the recording of time-break signals in seismic surveying including, in combination, an electronic circuit responsive to the time-break pulse to generate a series of pulses unequally timed and having a predetermined time relation with said time-break pulse to provide a signal from which the correct position of the time-break pulse can be determined regardless of its obscurity, a transmitter radiating a carrier signal, a circuit operatively connected with said transmitter and responsive to said time-break pulse for initiating radiating of said carrier, and means modulating said carrier with said series of pulses.

2. Apparatus for use in the recording of time-break signals in seismic surveying including, in combination, an electronic circuit responsive to the time-break pulse to generate a series of pulses at predetermined but unequal intervals having a predetermined time relation with said time-break pulse, and means combining said separate pulses with said time-break pulse to provide a signal from which the correct position of the time-break pulse can be determined regardless of its obscurity.

3. Apparatus for use in the recording of time-break signals in seismic surveying including, in combination, a series of time-delay circuits responsive to the time-break pulse to generate a series of pulses at predetermined intervals having a predetermined time relation with said time-break pulse, and means combining said separate pulses with said time-break pulse to provide a signal from which the correct position of the time-break pulse can be determined regardless of its obscurity.

4. Apparatus for use in the recording of time-break signals in seismic surveying including, in combination, a series of time-delay circuits responsive to the time-break pulse to generate a series of pulses of predetermined but unequal timing and having a predetermined time relation with said time-break pulse to provide a signal from which the correct position of the time-break pulse can be determined, a transmitter radiating a carrier signal, and means modulating said carrier with said series of pulses.

5. Apparatus for use in the recording of time-break signals in seismic surveying including, in combination, a series of time-delay circuits responsive to the time-break pulse to generate a series of pulses of predetermined but unequal timing and having a predetermined time relation with said time-break pulse to provide a signal from which the correct position of the time-break pulse can be determined regardless of its obscurity, means applying said time-break pulse to the first of said series of circuits, and means applying to each of the remaining circuits a delayed signal derived from a preceding circuit, a transmitter radiating a carrier signal, a circuit operatively connected with said transmitter and responsive to said time-break pulse for initiating radiating of said carrier, and means modulating said carrier with said series of pulses.

6. Apparatus for use in the recording of time-break signals in seismic surveying including, in combination, a series of time-delay circuits responsive to the time-break pulse to generate a series of pulses unequally timed and having a predetermined time relation with said time-break pulse to provide a signal from which the correct position of the time-break pulse can be determined regardless of its obscurity, a transmitter radiating a carrier signal, a circuit operatively connected with said transmitter and responsive to said time-break pulse for initiating radiating of said carrier, and means modulating said carrier with said series of pulses.

ARTHUR F. HASBROOK.

References Cited in the file of this patent

UNITED STATES PATENTS

| Number | Name | Date |
| --- | --- | --- |
| 2,084,845 | Holmes | June 22, 1937 |
| 2,340,770 | Reichert | Feb. 1, 1944 |
| 2,403,561 | Smith | July 9, 1946 |
| 2,415,359 | Loughlin | Feb. 4, 1947 |
| 2,435,903 | Ritzmann | Feb. 10, 1948 |
| 2,493,379 | Anderson et al. | Jan. 3, 1950 |